US009297084B2

(12) United States Patent
Joshi et al.

(10) Patent No.: US 9,297,084 B2
(45) Date of Patent: Mar. 29, 2016

(54) ELECTROCHEMICAL PRODUCTION OF HYDROGEN

(75) Inventors: Ashok V. Joshi, Salt Lake City, UT (US); Sai Bhavaraju, West Jordan, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 653 days.

(21) Appl. No.: 13/349,269

(22) Filed: Jan. 12, 2012

(65) Prior Publication Data

US 2012/0175268 A1    Jul. 12, 2012

Related U.S. Application Data

(60) Provisional application No. 61/432,117, filed on Jan. 12, 2011.

(51) Int. Cl.
| C25B 1/04 | (2006.01) |
| C25B 1/10 | (2006.01) |
| C25B 1/20 | (2006.01) |
| C25B 1/24 | (2006.01) |
| C25B 15/08 | (2006.01) |
| C25B 9/08 | (2006.01) |

(52) U.S. Cl.
CPC ... *C25B 9/08* (2013.01); *C25B 1/04* (2013.01); *C25B 1/10* (2013.01); *C25B 1/20* (2013.01); *C25B 1/24* (2013.01); *C25B 15/08* (2013.01); *Y02E 60/366* (2013.01); *Y02P 20/134* (2015.11)

(58) Field of Classification Search
CPC ..... C25B 1/10; C25B 1/14–1/16; C25B 1/46; C25B 1/24–1/26
USPC .................. 205/628–639, 615–625
See application file for complete search history.

(56) References Cited

U.S. PATENT DOCUMENTS

| 3,726,937 | A | * | 4/1973 | Stepanov et al. | 205/619 |
| 4,191,618 | A | * | 3/1980 | Coker et al. | 205/525 |
| 4,239,607 | A | * | 12/1980 | Maget | 205/348 |
| 4,488,945 | A | * | 12/1984 | Spaziante | 205/349 |
| 4,956,061 | A | * | 9/1990 | Dempsey et al. | 205/624 |
| 5,520,793 | A | | 5/1996 | Genders et al. | |
| 6,183,623 | B1 | | 2/2001 | Cisar et al. | |
| 6,638,413 | B1 | * | 10/2003 | Weinberg et al. | 205/637 |
| 6,719,891 | B2 | * | 4/2004 | Ruhr et al. | 205/500 |

(Continued)

OTHER PUBLICATIONS

Bruice, P. Organic Chemistry, 2nd Ed. 1998, p. 56.*
Lee, Jong K., "International Search Report", PCT/US2012/021099 (Corresponding to U.S. Appl. No. 13/349,269), (Aug. 30, 2012),1-4.
Lee, Jong K., "Written Opinion of the International Searching Authority", PCT/US2012/021099 (Corresponding to U.S. Appl. No. 13/349,269), (Aug. 30, 2012),1-3.

(Continued)

*Primary Examiner* — Nicholas A Smith
*Assistant Examiner* — Brian W Cohen
(74) *Attorney, Agent, or Firm* — David Fonda

(57) ABSTRACT

Electrochemical systems and methods for producing hydrogen. Generally, the systems and methods involve providing an electrochemical cell that includes an anolyte compartment holding an anode in contact with an anolyte, wherein the anolyte includes an oxidizable substance having a higher standard oxidation potential than water. The cell further comprises a catholyte compartment holding a cathode in contact with a catholyte that includes a substance that reduces to form hydrogen. Additionally, the cell includes an alkali cation conductive membrane that separates the anolyte compartment from the catholyte compartment. As an electrical potential passes between the anode and cathode, the reducible substance reduces to form hydrogen and the oxidizable substance oxidizes to form an oxidized product.

18 Claims, 5 Drawing Sheets

(56) References Cited

U.S. PATENT DOCUMENTS

| | | |
|---|---|---|
| 2002/0179456 A1 | 12/2002 | Yamashita et al. |
| 2005/0177008 A1 | 8/2005 | Balagopal et al. |
| 2007/0138020 A1* | 6/2007 | Balagopal et al. ............ 205/500 |
| 2008/0173540 A1 | 7/2008 | Joshi et al. |
| 2010/0089762 A1 | 4/2010 | Gordon |

OTHER PUBLICATIONS

Kosminsky, et al., "Studies on the catalytic reduction of iodate at glassy carbon electrodes modified by molybdenum oxides", *Journal of Electroanalytical Chemistry* 471 (1999), (Feb. 3, 1999),37-41.

* cited by examiner

ELECTROCHEMICAL PRODUCTION OF HYDROGEN

CROSS-REFERENCE TO RELATED APPLICATION

This application claims priority to, and the benefit of, U.S. Provisional Application No. 61/432,117, filed Jan. 12, 2011, entitled "Electrochemical Production of Hydrogen," the entire disclosure of which is hereby incorporated by reference.

FIELD OF THE INVENTION

The present invention relates in general to the electrochemical production of hydrogen. More particularly, the present invention provides systems and methods for producing hydrogen through the use of an electrochemical cell in which the anolyte comprises an oxidizable substance that has a higher (i.e. easier to oxidize) standard oxidation potential than water.

BACKGROUND OF THE INVENTION

Hydrogen gas is used in a variety of industrial applications. For instance, hydrogen is often used in the creation of ammonia for fertilizer, for the conversion of heavy petroleum sources to lighter fractions through a process called hydrocracking, for the production of nickel-hydrogen batteries, and for several other applications. Hydrogen is a clean burning fuel and a source of energy for fuel cells.

In order to obtain hydrogen for use in such applications, hydrogen can be produced through an assortment of techniques, including through the electrolysis of water, the reaction of a metal with an acid, the steam reformation of natural gas, the partial oxidation of hydrocarbons, and through several other methods.

Indeed, in some instances, hydrogen gas is formed through the electrolysis of water. In such instances, water or an alkaline water solution, such as sodium hydroxide or potassium hydroxide, is placed in an electrolytic cell comprising an anode and a cathode. Then as an electrical current is passed between the anode and cathode, hydrogen is produced at the cathode and oxygen is produced at the anode. For instance, the half reactions for traditional alkaline water electrolysis is:

Anode: 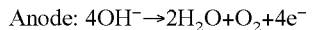 $4OH^- \rightarrow 2H_2O + O_2 + 4e^-$

Cathode: 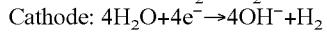 $4H_2O + 4e^- \rightarrow 4OH^- + H_2$

Moreover, the overall reaction of traditional alkaline water splitting is:

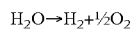 $H_2O \rightarrow H_2 + \tfrac{1}{2}O_2$

While the production of hydrogen gas through the electrolysis of water has been found to be a useful process, it is not without its shortcomings. For instance, in some instances, the overall cell voltage for the oxidation and reduction of traditional water electrolysis is about 1.23 volts ("V") and is typically ≥1.8V at practical current densities when the overvoltage is taken into account. As a result, the production of hydrogen through such traditional electrolytic methods may be relatively energy-intense, inefficient, and expensive.

BRIEF SUMMARY OF THE INVENTION

The present invention provides systems and methods for producing hydrogen gas through the use of an electrochemical cell. While the cell can comprise any suitable components, in some non-limiting instances, the cell comprises an anolyte compartment that houses an anolyte and an anode, a catholyte compartment that houses a catholyte and a cathode, and an alkali cation selective membrane that is disposed between the catholyte compartment and the anolyte compartment. In such instances, the cell is configured to hold a hydrogen-containing reducible substance in the catholyte to produce hydrogen gas where the cell open circuit voltage is lower than about 1.23V, and the cell operational voltage at practical current densities is lower than that of the traditional electrolysis cell voltage of water (usually ≥1.8V).

The anolyte can comprise any suitable substance that allows the cell to have an open circuit cell voltage of less than about 1.23V when the cell produces hydrogen. For example, the anolyte can comprise any suitable oxidizable substance having a higher standard oxidation potential than water i.e. a substance that is easier to oxidize. Some examples of such oxidizable substances include, but are not limited to, an iodide ion, a sulfide ion, a manganese oxide ion, and an aluminum oxide ion. In this regard, the oxidizable substance can be added to the anolyte in the form of an alkali metal salt of the oxidizable substance. Some examples of suitable alkali metal salts include, without limitation, an iodide, sulfide, manganese oxide, and aluminum oxide of each of the following: sodium, lithium, and potassium.

In addition to the oxidizable substance, the anolyte can also comprise any other suitable material. For instance, the anolyte can comprise a non-aqueous solvent (including, without limitation, glycerol and/or anhydrous methanol), a solid-state conductive additive (e.g., graphite), an aqueous solution, an ionic liquid, and/or any other suitable material or a liquid conductive additive (e.g. Tetramethylammonium Tetrafluroborate or conductive metal particles).

The catholyte can comprise any suitable substance that allows the cell to reduce a reducible substance in the catholyte to form hydrogen and that allows the cell to have an over cell voltage of less than about 1.23V during hydrogen production. Some examples of suitable substances that can be included in the catholyte include, but are not limited to, an alkali hydroxide (e.g., sodium hydroxide) and/or a non-aqueous methanol/alkali methoxide solution (e.g., a non-aqueous methanol/sodium methoxide solution).

The anode can comprise any suitable anode that allows the cell to oxidize the oxidizable substance in the anolyte when electrical potential passes between the anode and the cathode. Some examples of suitable anode materials include, but are not limited to, variety of stainless steels, metal alloys such as KOVAR, titanium, platinum, lead dioxide, carbon-based materials (e.g., boron-doped diamond, glassy carbon, synthetic carbon, carbides, graphite etc.), metal oxides such as Dimensionally Stable Anode and other known or novel anode materials. Additionally, in some embodiments in which the anolyte comprises an aqueous solution, the anode comprises a dimensionally stable anode, which may include, but is not limited to, rhenium dioxide and titanium dioxide on a titanium substrate, and ruthenium dioxide and tantalum pentoxide on a titanium substrate.

The cathode can comprise any suitable cathode that allows the cell to reduce a reducible substance in the catholyte to produce hydrogen gas. In this regard, some examples of suitable cathode materials include, without limitation, nickel, stainless steel, graphite, a nickel-cobalt-ferrous alloy (e.g., a KOVAR® alloy), and any other suitable cathode material that is known or novel.

With respect to the alkali cation selective membrane, the membrane can comprise virtually any suitable alkali cation selective membrane. Some examples of such membranes include, but are not limited to, a NaSICON membrane, a NaSICON-type membrane, a LiSICON membrane, a LiSICON-type membrane, a KSICON membrane, a KSICON-type membrane, a sodium conducting glass, a beta alumina membrane, and a solid polymeric sodium ion conductive membrane.

While the cell can function in any suitable manner, in some non-limiting instances, as an electrical current passes between the anode and the cathode, the reducible substance in the catholyte (e.g., water or methanol) is reduced to evolve hydrogen and the oxidizable substance in the anolyte is oxidized to produce an oxidized product. For instance, where the alkali metal salt of the oxidizable substance is selected from sodium iodide, sodium sulfide, sodium manganese oxide, or sodium aluminum oxide, the oxidizable substance can be oxidized to form molecular iodine, molecular sulfur, manganese oxide, and alumina, respectively. Additionally, as the electrical potential passes between the electrodes, the alkali cations from the alkali metal salt of the oxidizable substance are driven through the alkali cation selective membrane to allow the cations to enter the catholyte compartment where the cations can react to form an alkali hydroxide, an alkali methoxide, and/or a variety of other substances.

After hydrogen has been formed in the catholyte compartment and the oxidizable substance in the anolyte (e.g., the iodide ion or sulfide ion) has been oxidized to form an oxidized product (e.g., molecular iodine or sulfur), the oxidized product can be reacted with the alkali hydroxide from the catholyte compartment to regenerate the alkali metal salt of the oxidizable substance. For instance, where the oxidizable substance in the anolyte is obtained by adding sodium iodide to the anolyte, molecular iodine is formed from the oxidation of the iodide ion and sodium hydroxide can be formed in the catholyte compartment. In turn, the molecular iodine and the sodium hydroxide can be reacted together to regenerate sodium iodide, which can be recycled through the cell or otherwise be used in another electrolysis reaction.

While the described systems and methods have been found to be particularly useful for the production of hydrogen through the use of sodium iodide in the anolyte, the described methods (as stated above) may be modified to produce hydrogen through the use of one or more other oxidizable substances that has a higher standard oxidation potential than oxygen evolution from water. For example, instead of using sodium iodide in an anolyte, the described systems and methods may use any other alkali salt of a suitable oxidizable substance. For instance, the described systems and methods may use potassium iodide, lithium iodide, and/or a sulfide, manganese oxide, or aluminum oxide of an alkali metal selected from sodium, potassium, and lithium.

Another embodiment of the present invention is that the anolyte oxidizable substance is regenerated. In the foregoing example discussing sodium iodide as the anolyte oxidizable substance, the sodium iodide can be regenerated in any suitable manner. In one embodiment, the sodium iodide is regenerated by reacting oxidized product (iodine) from the anolyte with sodium hydroxide from the catholyte (or some other suitable source such as sodium methoxide). Therefore, most, if not substantially all, of the sodium iodide (or other alkali metal salt) can be regenerated for use in the cell.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which:

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and processes of the described invention, all of the described embodiments and examples are to be considered, in all respects, as illustrative only and not as being limiting in any manner.

Furthermore, the described features, structures, characteristics, processes, or methods of the invention may be combined in any suitable manner in one or more embodiments. In the following description, numerous specific details are provided, such as examples of suitable anolytes, catholytes, alkali cation selective membranes, anode materials, cathode materials, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, processes, or operations are not shown or described in detail to avoid obscuring aspects of the invention.

The present invention provides systems and methods for producing hydrogen gas through the use of an electrochemical cell that has a cell open circuit voltage that is lower than the traditional open circuit voltage for water splitting (about 1.23V). In order to do this, the current systems and methods replace the water oxidation reaction from traditional water electrolysis with a different anode reaction that has a higher standard oxidation potential than oxygen evolution from water. To provide a better understanding of the described systems and methods, the electrochemical cell is described below in more detail. This description of the cell is then followed by a more detailed description of the manner in which the cell can be operated.

Figure 1:
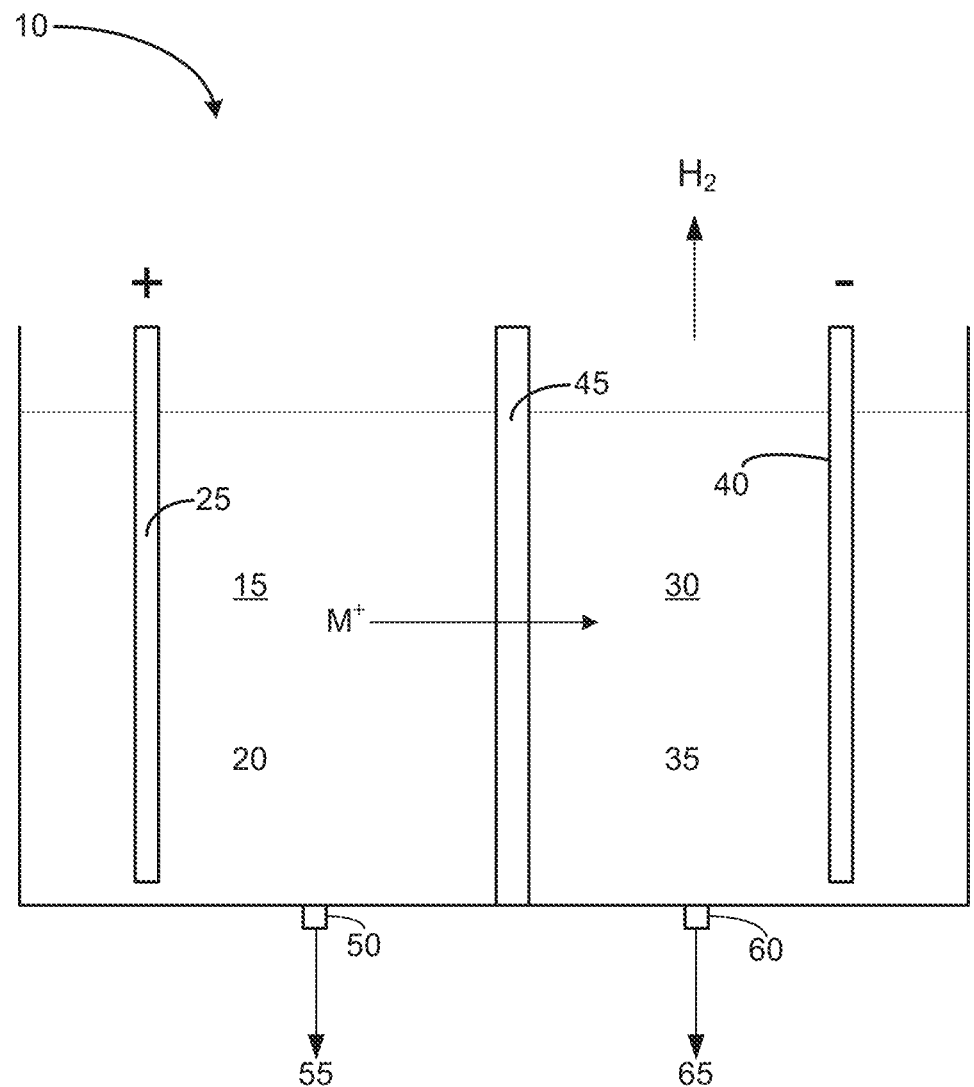
FIG. 1 depicts a schematic diagram of a representative embodiment of an electrochemical cell that is configured to produce hydrogen.

Turning now to the electrochemical cell, the cell can comprise any suitable component that allows it to produce hydrogen gas at practical levels at an over cell voltage that is less than about 1.8V. By way of non-limiting illustration, FIG. 1 shows a representative embodiment in which the electrochemical cell 10 comprises an anolyte compartment 15 that houses an anolyte 20 and an anode 25; a catholyte compartment 30 that houses a catholyte 35 and cathode 40; and an alkali cation selective membrane 45.

With respect to the anolyte compartment 15 and the catholyte compartment 30 in general, the two compartments can be any suitable shape and have any other suitable characteristic that allows the cell 10 to function as intended. By way of example, the anolyte and the catholyte compartments can be tubular, rectangular, or be any other suitable shape.

With regard to the anolyte 20, the anolyte can comprise any suitable substance or substances that allow the cell 10 to have an open circuit voltage that is less than about 1.23V when the cell 10 produces hydrogen. In this regard, the anolyte can comprise any suitable oxidizable substance that has a standard oxidation potential that is higher than that of oxygen evolution from water (i.e. easier to oxidize than water) and that allows the cell to function as intended. Said differently, the anolyte can comprise any suitable oxidizable substance that allows the open circuit cell voltage for the production of hydrogen to be less than a voltage selected from about 1.23V, about 1.2V, about 1.1V, and about 1V or less. Some examples of suitable oxidizable substances include, but are not limited to, an iodide ion, a sulfide ion, a manganese oxide ion, an aluminum oxide ion, and any other suitable oxidizable substance that has an oxidation potential that is higher than that of oxygen evolution from water.

The oxidizable substance in the anolyte 20 can be added to the anolyte in any suitable manner. For example, the oxidizable substance (e.g., the iodide ion, sulfide ion, etc.) can be added to anolyte through the addition of an alkali metal salt of the oxidizable substance. In this regard, some examples of suitable alkali metal salts of suitable oxidizable substances include, but are not limited to, sodium iodide, sodium sulfide, sodium manganese oxide, sodium aluminum oxide, lithium iodide, lithium sulfide, lithium manganese oxide, lithium aluminum oxide, potassium iodide, potassium sulfide, potassium manganese oxide, potassium aluminum oxide, and/or any other suitable alkali metal salt of a suitable oxidizable substance. In some embodiments, however, the alkali metal salt comprises sodium iodide As the cell 10 functions, the alkali metal salt of the oxidizable substance can react in any suitable manner. In one example, when the alkali metal salt is added to anolyte, the salt can be ionized. In another example, when an electrical potential is passed between the anode 25 and the cathode 40, the oxidizable substance of the alkali iodide, alkali sulfide, alkali manganese oxide, an alkali aluminum oxide, and/or another suitable alkali metal salt in the anolyte can respectively be oxidized to form molecular iodine, molecular sulfur, manganese oxide, alumina, and/or another oxidized product in the anolyte. Similarly, as the electrical potential passes between the electrodes, the alkali cation (e.g., $Na^+$, $Li^+$, and $K^+$) released from the alkali metal salt can be selectively conducted through the alkali cation selective membrane 45 (described below) to the catholyte compartment 30, where the cation can react to form an alkali hydroxide, alkali methoxide, or a variety of other products (depending on the contents of the catholyte 30, which is also discussed below).

In addition to the alkali metal salt of the oxidizable substance, the anolyte 20 can comprise any other suitable component that allows the oxidizable substance (e.g., ionic iodide, ionic sulfide, etc.) to be oxidized at the anode 25 and that allows the open circuit voltage of the cell 10 to be less than about 1.23V during hydrogen production. For instance, the anolyte can also comprise any suitable: non-aqueous solvent (including, without limitation, glycerol, anhydrous methanol, and/or another suitable non-aqueous solvent), solid-state conductive additive (including, without limitation, graphite and/or another suitable conductive additive), ionic liquid, and/or aqueous solvent. In this regard, however, the additional additives to the anolyte should not cause the preferential oxidation of another substance over the oxidation of the oxidizable substance. Similarly, in some embodiments, to reduce the over cell voltage, the additional additives to the anolyte do not chemically react with the anode.

Some non-limiting examples of suitable anolytes 20 are as follows. Specifically, in some embodiments, the anolyte 20 comprises an alkali metal salt of an oxidizable substance that is mixed with a conductive additive (e.g., graphite) and a liquid additive/solvent, such as glycerol, to form a semi-solid paste. By way of example, in some embodiments, the anolyte comprises sodium iodide or sodium sulfide, graphite, and a small amount of glycerol. In other embodiments, the anolyte comprises an alkali metal salt that is dissolved in a suitable solvent (e.g., methanol, water, and/or an ionic liquid). For example, in some embodiments, the anolyte comprises sodium iodide or sodium sulfide in methanol. Along these lines, in still another example, the anolyte comprises sodium iodide or sodium sulfide in water.

With regard now to the catholyte 35, the catholyte can comprise any suitable substance that allows the cell 10 to reduce a reducible substance, such as water and/or methanol, in the catholyte to form hydrogen and allows the cell to have an open circuit voltage that is less than a voltage selected from about 1.23V, about 1.2V, about 1.1V, and about 1V or less and ≤1.8V at practical currents when the cell produces hydrogen.

Some examples of suitable catholytes include, but are not limited to, an aqueous alkali hydroxide solution (e.g., an aqueous solution comprising sodium hydroxide, lithium hydroxide, and/or potassium hydroxide) and a non-aqueous methanol/alkali methoxide solution, wherein the alkali methoxide is selected from sodium methoxide, lithium methoxide, and potassium methoxide. Indeed, in some embodiments, the catholyte comprises an aqueous sodium hydroxide solution or a non-aqueous methanol/sodium methoxide solution.

Referring now to the anode 25, the anode can comprise any suitable characteristic or material that allows the cell 10 to oxidize the oxidizable substance in the anolyte 20 and to otherwise function as intended. By way of example, the anode can have any suitable characteristic, including, without limitation, being: a flat plate, a flat membrane, a mesh, a tubular shape, and/or a tubular mesh.

Some examples of suitable anode materials include, but are not limited to, stainless steel, titanium, lead dioxide, carbon-based materials (e.g., boron-doped diamond, glassy carbon, synthetic carbon, etc.), platinized titanium, ruthenium (IV) dioxide ($RuO_2$), dimensionally stable anode materials, and/or any other suitable anode material. Indeed, in some embodiments, the anode comprises a stainless steel mesh.

In some embodiments in which the anolyte 20 comprises an aqueous solution, the anode 25 comprises a dimensionally stable anode, which may include, but is not limited to, a rhenium dioxide and titanium dioxide on a titanium substrate, and a rhenium dioxide and tantalum pentoxide on a titanium substrate. In such embodiments, the dimensionally stable anode may help the cell 10 to preferentially oxidize the oxidizable substance (e.g., the iodide ion, the sulfide ion, etc.) over some other chemical in the anolyte.

With respect to the cathode 40, the cathode can comprise any suitable characteristic or material that allows the cell 10 to reduce the reducible substance (e.g., water and/or methanol) to produce hydrogen and to otherwise allow the cell to function as intended. By way of example, the cathode can have any suitable characteristic, including, without limitation, being: a flat plate, a flat membrane, a mesh, a tubular shape, and/or a tubular mesh. Additionally, some examples of suitable cathode materials include, but are not limited to, nickel, stainless steel, graphite, a nickel-cobalt-ferrous alloy (e.g., a KOVAR® alloy), and/or any other suitable cathode material. Indeed, in some embodiments, the cathode comprises a nickel mesh cathode.

As electrical potential is passed between the electrodes 25 and 40, any suitable reaction that allows the cell 10 to produce hydrogen can occur at the cathode 40. Some examples of suitable cathodic reactions include, but are not limited to, the following:

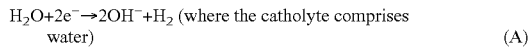

$H_2O+2e^- \rightarrow 2OH^- +H_2$ (where the catholyte comprises water)     (A)

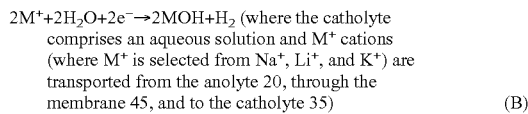

$2M^+ + 2H_2O + 2e^- \rightarrow 2MOH + H_2$ (where the catholyte comprises an aqueous solution and $M^+$ cations (where $M^+$ is selected from $Na^+$, $Li^+$, and $K^+$) are transported from the anolyte 20, through the membrane 45, and to the catholyte 35)     (B)

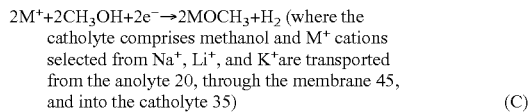

$2M^+ + 2CH_3OH + 2e^- \rightarrow 2MOCH_3 + H_2$ (where the catholyte comprises methanol and $M^+$ cations selected from $Na^+$, $Li^+$, and $K^+$ are transported from the anolyte 20, through the membrane 45, and into the catholyte 35)     (C)

Thus, in some embodiments where the alkali metal salt comprises a sodium, potassium, or lithium ion and the catholyte 35 comprises water, sodium hydroxide, potassium hydroxide, or lithium hydroxide will respectively be formed in the catholyte compartment 30. Similarly, in some embodiments where the alkali metal salt comprises a sodium, potassium, or lithium ion and the catholyte 35 comprises methanol, sodium methoxide, potassium methoxide, or lithium methoxide, respectively, will be formed in the catholyte compartment 30 as the cell 10 functions.

Moving now to the alkali cation selective membrane 45, the membrane can comprise virtually any suitable cation selective membrane that is configured to selectively transport an alkali cation (e.g., $Na^+$, $Li^+$, or $K^+$) from the anolyte compartment 15 to the catholyte compartment 30 under the influence of an electrical potential. In this manner, the membrane can prevent the anolyte and catholyte from mixing, while still allowing alkali cations (shown as $M^+$ in FIG. 1) to migrate to the catholyte compartment 30. Accordingly, in some embodiments, the membrane allows the cell 10 to comprise a non-aqueous anolyte and an aqueous catholyte, and vice versa.

Some examples of such membranes include, but are not limited to, a NaSICON membrane, a NaSICON-type membrane (e.g., a NaSICON-type membrane as produced by Ceramatec, Inc., Salt Lake City, Utah), a LiSICON membrane, a LiSICON-type membrane, a KSICON membrane, a KSICON-type membrane, a sodium conducting glass, a beta alumina membrane, a solid polymeric sodium ion conductive membrane, and any other suitable cation conductive membrane.

In addition to the aforementioned components and characteristics, the described cell 10 can comprise any other suitable component or characteristic. In this regard, in some embodiments, the various compartments of the cell have one or more inlets and/or outlets to allow materials to be added to and/or to be removed from the cell. By way of non-limiting illustration, FIG. 1 shows an embodiment in which the anolyte compartment 15 comprises an outlet 50 for removing oxidized products 55 (e.g., $I_2$, S, etc.) from the anolyte compartment, and the catholyte compartment 30 comprises an outlet 60 for removing chemicals 65, including without limitation, an alkali hydroxide and/or an alkali methoxide, from the catholyte chamber (depending on whether the catholyte 35 originally comprised water and/or methanol).

In some embodiments, the cell 10 also comprises a power source (not shown). In such embodiments, the power source can comprise any suitable electrolytic cell power source. Furthermore, the power source can provide the cell with any suitable current density. Indeed, in some embodiments, the power source provides the cell with a current density as low as a current density selected from about 0.5 $mA/cm^2$, about 1 $mA/cm^2$, about 2.5 $mA/cm^2$, and about 5 $mA/cm^2$. Additionally, in some embodiments, the power source provides the cell with a current density that is as high as a current density selected from about 15 $mA/cm^2$, about 20 $mA/cm^2$, about 25 $mA/cm^2$, about 30 $mA/cm^2$, and about 45 $mA/cm^2$.

In some embodiments, the cell 10 optionally comprises a heating mechanism that is configured to heat the anolyte 20 and/or catholyte 35 as the cell functions. Indeed, while the cell can function at any suitable temperature, in some embodiments, the anolyte and/or catholyte are heated to a temperature that is above a temperature selected from about 40 degrees Celsius, about 60 degrees Celsius, about 80 degrees Celsius, and about 90 degrees Celsius. Moreover, in such embodiments, the anolyte and/or catholyte are kept cooler than a temperature that is selected from about 140 degrees Celsius, about 130 degrees Celsius, about 120 degrees Celsius, and about 100 degrees Celsius.

Turning now to the manner in which the cell 10 functions, the cell may function in any suitable manner. To provide a better understanding of the manner in which the cell may function, FIGS. 2A and 2B respectively show a representative embodiment of a flow chart and a schematic diagram depicting an embodiment of a method 100 in which the cell may produce hydrogen. In this regard, it should be noted that the systems and methods shown in FIGS. 2A and 2B can be rearranged, added to, shortened, and/or otherwise changed in any suitable manner.

Figure 2A:
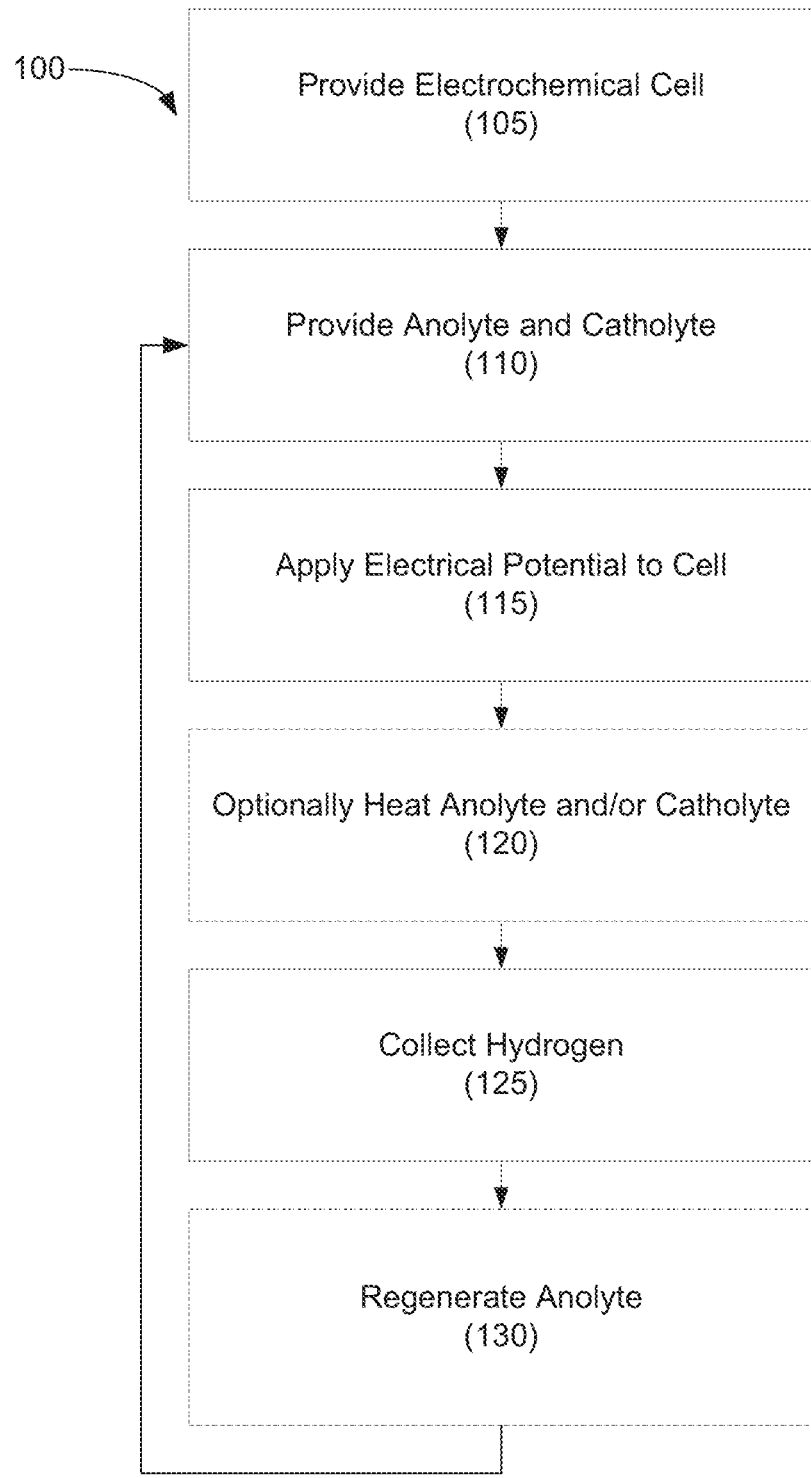
FIG. 2A depicts a flow chart showing a representative embodiment of a method for using the electrochemical cell.

At step 105, FIG. 2A shows that a representative embodiment of the described method 100 begins by providing the electrochemical cell 10 (as discussed above). Next, step 110 shows that the method continues as the anolyte 20 and catholyte 35 are added to the cell. While the skilled artisan will recognize that the described systems and methods can be implemented with any suitable anolyte and/or catholyte (as discussed above), for the sake of simplicity, the following discussion focuses on using the cell with an anolyte 20 comprising sodium iodide and a catholyte 35 comprising water (e.g., from an aqueous solution of sodium hydroxide).

Moving on to step 115, FIG. 2A shows the method 100 continues as an electrical potential is passed between the anode 25 and the cathode 40. As this occurs, FIG. 2B shows that (i) the iodide ion ($2I^-$) is oxidized at the anode 25 to form molecular iodine ($I_2$), (ii) the sodium cation ($2Na^+$) is transported through the membrane 45, and (iii) water ($H_2O$) is reduced at the cathode 40 to form hydrogen gas ($H_2$) and hydroxide ions ($OH^-$), which can react with the sodium cations to form sodium hydroxide (NaOH).

Figure 2B:
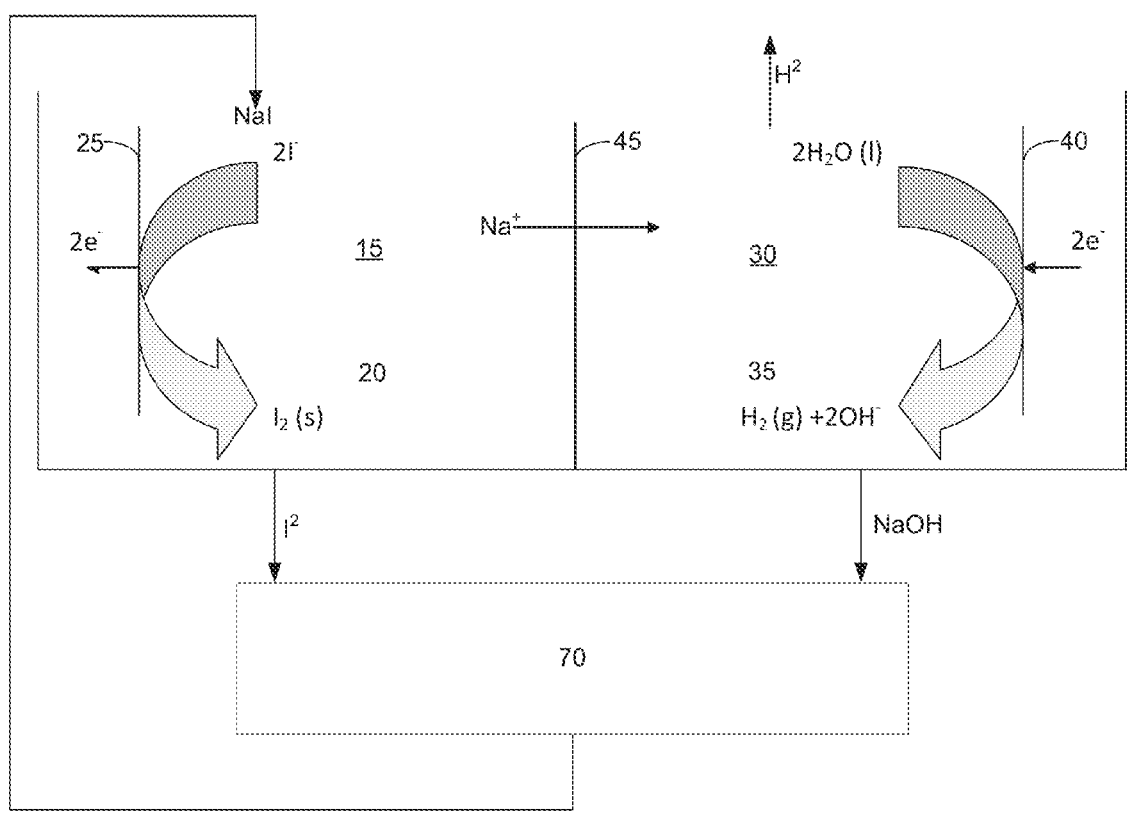
FIG. 2B depicts a schematic diagram of a representative embodiment of the electrochemical cell in which the cell comprises an anolyte that comprises sodium iodide, and a catholyte that comprises a sodium hydroxide solution.

Similarly, the following reactions D and E show that, in at least some embodiments, the calculated open cell voltage for the cell 10 illustrated in FIG. 2B is about 0.94V, which is smaller than the 1.23V over cell voltage for traditional water electrolysis.

$$\text{Oxidation reaction at the anode 25: NaI(s)} \rightarrow \tfrac{1}{2}I_2 + Na^+ \quad (E_0 = +3.0V \text{ (reduction potential))}. \tag{D}$$

$$\text{Reduction reaction at the cathode 40: } Na^+ + H_2O \rightarrow NaOH + H_2 \ (E_0 = +3.94V \text{ (reduction potential))}. \tag{E}$$

In this regard, over cell voltage required for the overall reaction is calculated as $E_0$ red $-E_0$ oxd$=+3.94-3.0=0.94V$.

As the cell 10 functions, step 120 in FIG. 2A shows that the method 100 optionally includes heating the anolyte and/or the catholyte, as discussed above.

Step 125 further shows that as the method 100 continues, hydrogen gas ($H_2$) is collected from the catholyte compartment 30 (also shown in FIG. 2B).

Next, step 130 shows that the method 100 can optionally continue as the anolyte oxidizable substance is regenerated. In the foregoing example discussing sodium iodide as the anolyte oxidizable substance, the sodium iodide can be regenerated in any suitable manner. Indeed, in some embodiments, the sodium iodide is regenerated by reacting iodine from the anolyte 20 with sodium hydroxide from the catholyte 35 (or some other suitable source) in a regeneratin cell 70. The regenerated sodium iodide (or other anolyte oxidizable substance) may be recycled for use in the anolyte 20. Accordingly, most, if not substantially all, of the sodium iodide (or other alkali metal salt) can be regenerated for use in the cell 10.

Again, it should be noted that while the current example discusses reacting iodine with sodium hydroxide to regenerate sodium iodide, the described methods can be used to regenerate any suitable alkali salt of an oxidizable substance by combining any suitable oxidized product (e.g., molecular iodine, molecular sulfur, manganese oxide, alumina, etc.) produced in the anolyte compartment 15 with a suitable alkali hydroxide (e.g., sodium hydroxide, potassium hydroxide, or lithium hydroxide) that is produced in the catholyte compartment 30 (or which is obtained from any other suitable source).

With respect to the manner in which sodium iodide is regenerate, in some embodiments, the sodium iodide is regenerated by mixing the molecular iodine with sodium hydroxide and then reducing one or more products of that reaction under acidic conditions. For instance, the following reactions F and G describe some possible manners in which such embodiments of this process may occur:

$$I_2 + 2OH^- \rightarrow I^- + OI^- + H_2O \tag{F}$$

$$3IO^- \rightarrow 2I^- - IO_3^- \tag{G}$$

Combining reactions F and G gives:

$$3I_2 + 6OH^- \rightarrow IO_3^{31} + 5I^- + 3H_2O \tag{H}$$

While the iodate ion ($IO_3^-$) can be converted to the iodide ion ($I^-$) in any suitable manner, in some embodiments, the conversion of the iodate ion is possible when the ion is reduced in acidic conditions in the presence of a glassy carbon electrode modified by molybdenum oxides as shown in the following reaction I:

$$IO_3^- + 6H^+ + 6e^- \leftrightarrow I^- + 3H_2O \tag{I}$$ quiry place to put art pgp21

Accordingly, when the sodium cation (e.g., from the sodium hydroxide) reacts with the iodide ion, the sodium iodide salt can be regenerated, as shown in the following equation J:

$$Na^+ + I^- \rightarrow NaI \tag{J}$$

For a more detailed discussion concerning the conversion of the iodate ion to the iodide ion, see Luis Kosminsky, M. B. (1999), Studies on the catalytic reduction of iodate at glassy carbon electrodes by molybdenum oxides, Electroanalytical Chemistry, 37-41; the entire disclosure of which is hereby incorporated by reference.

In some other embodiments, when sodium hydroxide is reacted with molecular iodine, the reaction can proceed in a variety of manners. By way of example, reactions K and L (below) show that in some embodiments when sodium hydroxide is reacted with iodine, sodium iodate forms. Nevertheless, reaction M (below) shows that, in other embodiments, the formation of sodium iodate can be avoided.

$$2NaOH + I_2 \rightarrow NaI + NaOI + H_2O \tag{K}$$

$$3NaOI \rightarrow NaIO_3 + 2NaI \tag{L}$$

$$2NaOH + I_2 \rightarrow 2NaI + H_2O + \tfrac{1}{2}O_2 \tag{M}$$

Because the formation of a sodium iodate intermediate product may be less favorable than simply producing sodium iodide without forming sodium iodate, in some embodiments, the process is configured to preferentially facilitate or reaction M over reactions K and/or L. In this regard, the conversion of sodium hydroxide and iodine directly into sodium iodide, water, and oxygen (e.g., reaction M) can be driven in any suitable manner, including, without limitation, by adding highly concentrated sodium hydroxide (or another alkali hydroxide) to the iodine (or to another oxidized product); by heating the reaction; by reacting the sodium hydroxide (or another alkali hydroxide) with the iodine (or another oxidized product) in the presence of a catalyst, ultraviolet light, and/or ultrasonic vibrations; and/or by any other suitable conditions.

Light, heat, organic matter, and certain heavy metals (such as copper, nickel, and cobalt) accelerate the rate of decomposition of sodium hypoiodite. The presence of transition metal ions (copper and nickel) is known to catalyze the decomposition of liquid sodium hypoiodite, contributing to the loss of sodium hypoiodite strength and the formation of oxygen. Also sodium hypoiodite decomposition is dependant on temperature. For any given temperature, the higher the strength, the faster it decomposes.

Where the regeneration of sodium iodide (or another alkyl metal salt) is facilitated by adding highly concentrated sodium hydroxide (or another alkyl hydroxide) to molecular iodine (or to another oxidized product) (e.g., through reaction M), the sodium hydroxide (or other alkyl hydroxide) can have any suitable concentration before it is added to the iodine (or other oxidized product). In some embodiments, the concentration of the sodium hydroxide (or other alkyl hydroxide) that is added to the molecular iodine (or other oxidized product) is as low as a concentration selected from about 15%, about 25%, about 30%, and about 35% by weight. In contrast, in some embodiments, the concentration of sodium hydroxide (or another alkyl hydroxide) that is added to the molecular iodine (or another oxidized product) is as high as a concentration selected from about 35%, about 40%, about 50%, and about 65%, by weight. Indeed, in some embodiments, the concentration of the sodium hydroxide is between about 30% and about 50%, by weight, before the sodium hydroxide is added to the molecular iodine.

Where the sodium hydroxide (or another alkyl hydroxide) is concentrated before being added to the molecular iodine (or another oxidized material), the sodium hydroxide can be concentrated in any suitable manner. In this regard, some examples of suitable methods for concentrating the sodium hydroxide (or other alkyl hydroxide) include, but are not limited to evaporating solvent (e.g., water) from the sodium hydroxide with heat obtained through solar energy, waste heat produced as an industrial byproduct, heat obtained through geothermal energy, and/or heat produced in any other suitable manner. Indeed, because heat obtained from solar energy, geothermal energy, and from industrial waste heat can be relatively inexpensive or substantially free. Such heat sources are also environmentally friendly. In some embodiments, the sodium hydroxide is concentrated through an evaporative process employing one or more such heat sources.

Where the regeneration of sodium iodide (or another alkali metal salt) is facilitated by heating the reaction (e.g., to drive reaction M), the reaction can be heated to any suitable temperature. The temperature should be below the boiling point of the reactants. Indeed, in some embodiments, the reaction is heated to a temperature that is as high as a temperature selected from about 110 degrees Celsius, about 120 degrees Celsius, about 130 degrees Celsius, and about 140 degrees Celsius. Additionally, when the reaction is heated, the reaction may be kept below a temperature as low as a temperature selected from about 100 degrees Celsius, about 90 degrees Celsius, about 70 degrees Celsius, and about 60 degrees Celsius. Indeed, in some embodiments, the reaction is heated to a temperature between about 70 and about 140 degrees Celsius.

Where the regeneration reaction is driven by heating the reaction, the reaction can be heated in any suitable manner. For instance, the reaction can be heated with heat obtained from solar energy, geothermal energy, industrial waste heat, and/or any other suitable heat source.

Where the regeneration reaction (e.g., reaction M) is driven by reacting the sodium hydroxide (or another alkali hydroxide) with iodine (or another oxidized product) in the presence of a catalyst, the catalyst can comprise any suitable catalyst, including, without limitation, a carbon catalyst and/or a metal-oxide catalyst. In this regard, one example of a suitable catalyst includes, but is not limited to, a catalyst comprising copper oxide (CuO) and magnesium dioxide ($MnO_2$).

Where the regeneration of the alkali metal salt (e.g., reaction M) is facilitated by exposing the reaction to ultraviolet light, the reaction may be exposed to any suitable wavelength of ultraviolet light, from any suitable source, including, without limitation, the sun, an ultraviolet lamp, etc.

Where the regeneration of the alkali metal salt (e.g., reaction M) is facilitated by exposing the reaction to ultrasonic vibrations, the reaction can be exposed to ultrasonic vibrations having any suitable frequency and amplitude.

The described systems and methods may have several beneficial characteristics. In one example, the described methods are able to produce hydrogen through a method that uses less electrical energy than does the production of hydrogen through some traditional methods for producing hydrogen gas through the electrolysis of water. Accordingly, some embodiments of the described systems and methods may more efficient and/or less expensive than some conventional methods of water electrolysis.

In another example, because the described systems and methods include an alkali cation selective membrane, the described systems allow the cell 10 to keep the contents of the anolyte 15 and catholyte 30 compartments separate. In this manner, the described systems and methods can allow the cell to function while the anolyte 20 and the catholyte 35 comprise different materials.

In still another example, because the alkali metal salt can be regenerated by mixing the oxidized product from the anolyte compartment 15 with the alkali hydroxide produced in the catholyte compartment 30, in some embodiments, most, if not all of the alkali metal salt can be regenerated and be recycled through the cell 10 to produce more hydrogen. In this manner, the described systems and methods may be more efficient and less costly than they would otherwise be if the alkali metal salt could not be regenerated.

The following examples and experimental results are given to illustrate various embodiments within the scope of the present invention. These are given by way of example only, and it is understood that the following examples are not comprehensive or exhaustive of the many types of embodiments of the present invention that can be prepared in accordance with the present invention.

EXAMPLES

In one example showing how the described systems and methods may function, the described cell 10 was used with an anolyte consisting of a 1:1 weight ratio of sodium iodide (NaI) to 20 um graphite, with a small amount of glycerol to bind the mixture.

In the described example, the dependent variables were temperature and current density. In particular, the cell 10 was operated at 65 degrees Celsius and 100 degrees Celsius as well as with a current density of 1 and 25 $mA/cm^2$. Accordingly, the cell underwent 4 runs.

To provide a better understanding of the described experimental results, a brief description of the experimental setup is provided below.

The sodium iodide used was 99.9% NaI (metals basis). Furthermore, the glycerol used for mixing the sodium iodide with the graphite was a conventional 99% glycerol.

With respect to the catholyte, the catholyte used in all tests was a 15 wt % NaOH solution.

Turning now to the components of the cell 10, because a stainless steel mesh anode was found to provide a lower overall cell voltage than did platinum and titanium mesh anodes, a stainless steel mesh was used as the anode 25 for the majority of tests. Along these lines, a nickel mesh was used as the cathode 40 in all of the experiments. Furthermore, a NaSICON membrane having an area and thickness of about 3.24 $cm^2$ and about 0.5 mm, respectively, was used as the membrane 45 to separate the anolyte 15 and the catholyte 30 compartments. Additionally, high-temperature-rated polytetrafluoroethylene (TEFLON®) tubing and tube fittings were used to pump the 15 wt % NaOH in and out of the cell.

With respect now to the cell's setup, the electrodes 25 and 40 were each positioned approximately 1 mm from the membrane 45 (e.g., the thickness of a conventional gasket). The anolyte paste was placed directly on an exposed part of the membrane 45, in the center of a gasket (not shown). The anode 25, in turn, was then placed over the anolyte paste and onto the gasket, followed by an additional layer of sodium iodide/graphite paste on the outside part of the anode 25. The membrane 45 and electrodes 25 and 40 were then sealed in a scaffold (not shown). Under such conditions, the anolytes and catholytes were assumed to be turbulent enough to minimize boundary layers and large bubble formations between the electrodes and membrane.

After the cell 10 was setup, the cell and cell solutions were allowed to heat up to the desired temperature (e.g., 65 or 100 degrees Celsius). At that point, the solutions were then allowed to circulate along with an applied voltage. A SOLARTRON® 1255B Frequency Response Analyzer with SI1287 Electrochemical Interface or a BK PRECISION® 1786B was used to provide the constant current to the cell.

Figure 3:
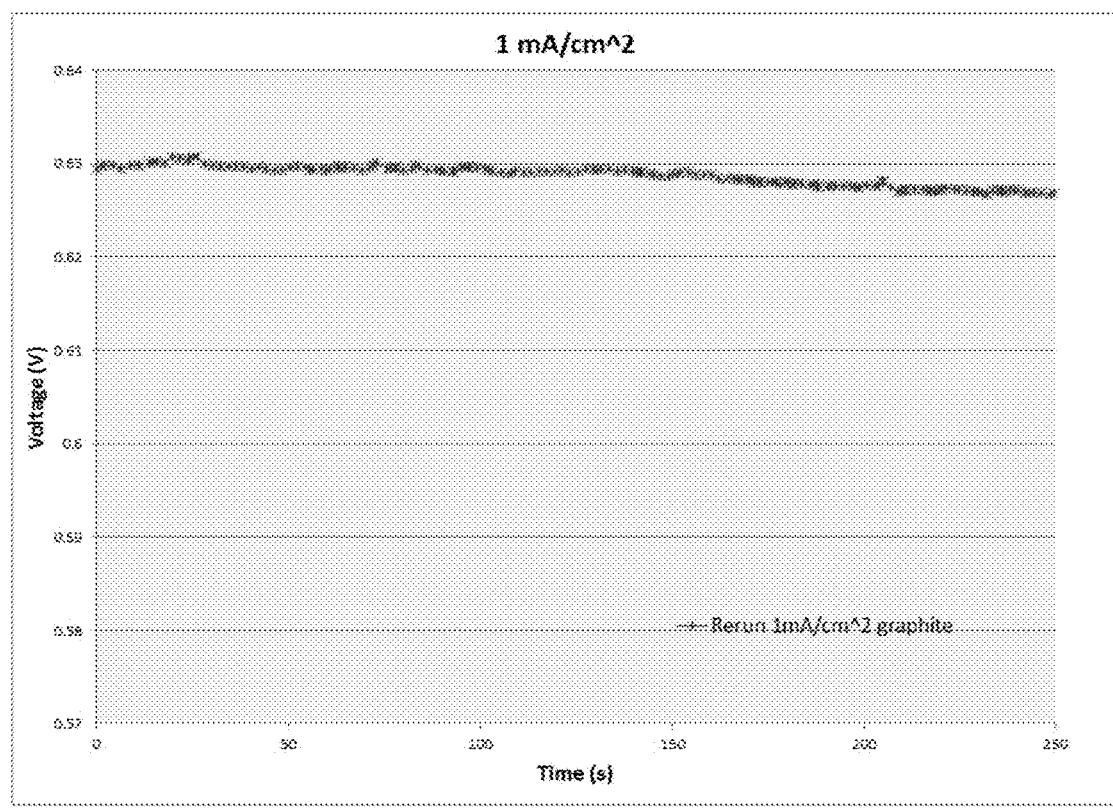
FIG. 3 depicts a graph showing computer-generated test results that plots voltage against time for one embodiment of the cell wherein voltage is applied to the cell at about 1 $mA/cm^2$.
Figure 4:
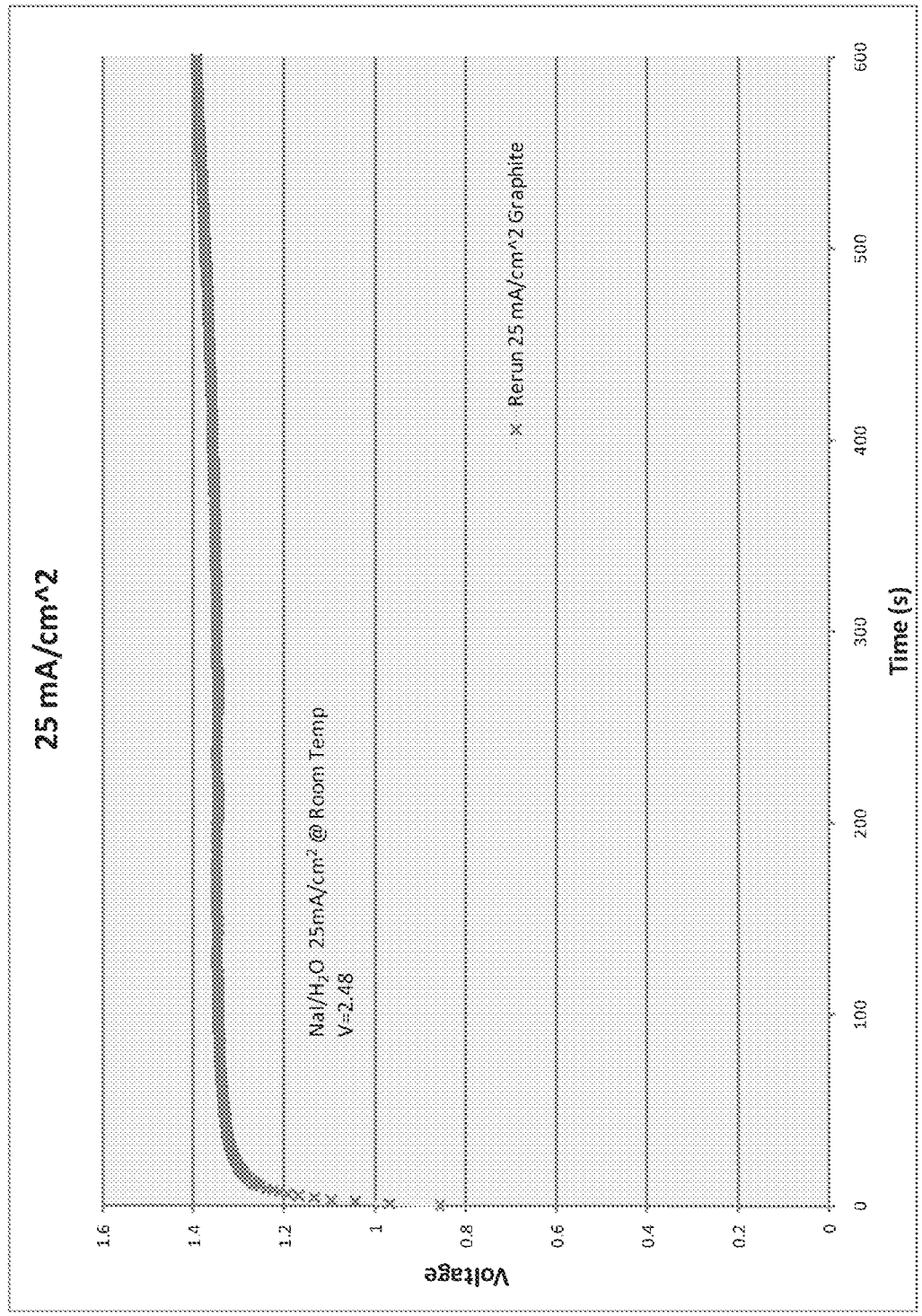
FIG. 4 depicts a graph showing computer-generated test results that plots voltage against time for one embodiment of the cell wherein voltage is applied to the cell at about 25 $mA/cm^2$.

Turning now to the experimental results, FIGS. 3 and 4 show the voltage vs. time plots for the tests run at 1 and 25 mA/cm$^2$, respectively.

As can be seen from FIGS. 3 and 4, the graphs indicate that in both cases (1 and 25 mA/cm$^2$) with a sodium iodide/ graphite as the anolyte solid, the cell of the present invention had a lower voltage than that of traditional electrolyzers.

It is noted that when the cell 10 was operated at 25 mA/cm$^2$, wide oscillation (e.g., ±1V) was observed after about 5 minutes for the runs at both 65 and 100 degrees Celsius. It is currently believed that this oscillation was due to bubbles forming in between the cathode 40 and membrane 45, causing irregularities in voltage and making it hard to distinguish the effect of temperature on these runs. Although a smaller catholyte chamber in the cell was used to increase the catholyte flow rate next to the cathode, a similar result was still observed.

Furthermore, FIG. 4 shows a voltage increase for the 25 mA/cm$^2$ at 65 degrees Celsius. This run was retested again and showed a much lower voltage. As mentioned earlier, this is one of the runs that has not been reproduced. Additionally, it was found that, in some embodiments, an ultrasonic device also helps to reduce voltage significantly.

Thus, from the described experiments, it has been shown that it is possible to reduce the voltage in producing hydrogen by using different oxidation reactions at the anode. Additionally, it has been shown that, in at least some embodiments, an increase in temperature may reduce the voltage while an increase in current (current density) may increase in potential. Furthermore, the described experiments show that, in at least in some embodiments, sodium iodide/graphite and sodium iodide in methanol are well suited for use as the anolyte. That said, sodium iodide/graphite has the potential to be used at higher temperatures than sodium iodide/methanol. Finally, the described experiments also showed that nickel and stainless steel cathodes and anodes, respectively, can help reduce the electrical potential needed to produce hydrogen in the cell.

While specific embodiments and examples of the present invention have been illustrated and described, numerous modifications come to mind without significantly departing from the spirit of the invention, and the scope of protection is only limited by the scope of the accompanying claims.

The invention claimed is:

1. A hydrogen producing electrochemical cell comprising:
an anolyte compartment holding an anolyte, the anolyte compartment comprising an inlet, an anode in contact with the anolyte, wherein the anolyte comprises an oxidizable substance having a higher standard oxidation potential than water;
a catholyte compartment holding a catholyte, the catholyte compartment comprising a cathode in contact with the catholyte, wherein the catholyte comprises a reducible substance that is electrochemically reducible to form hydrogen; and
an alkali cation conductive membrane selective to an alkali metal cation, the membrane being positioned between the anolyte compartment and the catholyte compartment;
an electrical potential source connected to the anode and to the cathode to provide a cell operational voltage less than the electrolysis voltage of water to oxidize the oxidizable substance in the anolyte compartment to form an oxidized product and to reduce the reducible substance in the catholyte compartment to form hydrogen and a reduced product;
an anolyte compartment outlet for removing the oxidized product;
a catholyte compartment outlet for removing the reduced product; and
a regeneration cell, comprising an inlet in direct fluid communication with the anolyte compartment outlet, configured to receive the oxidized product from the anolyte compartment and the reduced product from the catholyte compartment and is further configured to cause a chemical reaction between the oxidized product and the reduced product to regenerate the oxidizable substance, and wherein the regeneration cell comprises an outlet in communication with the anolyte compartment inlet such that the oxidizable substance of the regeneration cell can be fed into the anolyte compartment.

2. The electrochemical cell of claim 1, wherein the alkali cation conductive membrane is selected from a NaSICON membrane, a NaSICON-type membrane, a LiSICON membrane, a LiSICON-type membrane, a KSICON membrane, a KSICON-type membrane, a sodium conducting glass, a beta alumina membrane, and a solid polymeric sodium ion conductive membrane.

3. The electrochemical cell of claim 1, wherein the oxidizable substance comprises an iodide ion.

4. The electrochemical cell of claim 1, wherein the anolyte comprises a material selected from a non-aqueous solvent and a solid-state conductive additive.

5. The electrochemical cell of claim 1, wherein the anode comprises a dimensionally stable anode and the anolyte comprises an aqueous solvent.

6. The electrochemical cell of claim 1, wherein the catholyte comprises a chemical selected from an aqueous alkali hydroxide and a non-aqueous methanol/sodium methoxide solution.

7. The electrochemical cell of claim 1, wherein the oxidizable substance is selected from an halide ion, a chalcogenide ion, a manganese oxide ion, and an aluminum oxide ion.

8. The electrochemical cell of claim 7, wherein the halide ion is selected from iodine or bromine ion and the chalcogenide ion comprises sulfur, selenium or tellurium ion.

9. The electrochemical cell of claim 1, wherein the anolyte comprises an alkali metal salt of the oxidizable substance.

10. The electrochemical cell of claim 1, wherein the anolyte comprises sodium iodide or sodium sulfide and an additive selected from a mixture of conductive material, organic solvent, wherein the conductive material is selected from graphite, titanium, tantalum, molybdenum while organic solvent selected from alcohols, glymes or ethers or solvents from ionic-liquid class.

11. The electrochemical cell of claim 1, wherein the anolyte compartment further comprising a heating mechanism to heat the anolyte to between about 40 and about 140 degrees Celsius.

12. The electrochemical cell of claim 1, wherein the regeneration cell is heated to a reaction temperature between about 70 degrees Celsius and about 140 degrees Celsius to promote the regeneration of the oxidizable substance.

13. The electrochemical cell of claim 12, wherein the regeneration cell is heated with heat obtained from solar energy, geothermal energy, and heat produced as an industrial byproduct.

14. The electrochemical cell of claim 1, wherein the oxidizable substance is alkali metal iodide, the oxidized product is molecular iodine, and the reduced product is alkali hydroxide.

15. The electrochemical cell of claim 14, wherein the alkali hydroxide that reacts with the molecular iodine in the regeneration cell is concentrated to a concentration between about 30% and about 50% by weight.

16. The electrochemical cell of claim 14, wherein the regeneration cell comprises a metal-oxide catalyst to facilitate the reaction of molecular iodine and the alkali hydroxide to form the alkali metal iodide.

17. A hydrogen producing electrochemical cell comprising:
- an anolyte compartment holding an anolyte, the anolyte compartment comprising an anode in contact with the anolyte, wherein the anolyte comprises alkali metal iodide;
- a catholyte compartment holding a catholyte, the catholyte compartment comprising a cathode in contact with the catholyte, wherein the catholyte comprises a reducible substance that is electrochemically reducible to form hydrogen; and
- an alkali cation conductive membrane selective to an alkali metal cation, the membrane being positioned between the anolyte compartment and the catholyte compartment;
- an electrical potential source connected to the anode and to the cathode to provide a cell operational voltage less than the electrolysis voltage of water to oxidize the alkali metal iodide in the anolyte compartment to form molecular iodine and to reduce the reducible substance in the catholyte compartment to form hydrogen and alkali hydroxide;
- an anolyte compartment outlet for removing the molecular iodine;
- a catholyte compartment outlet for removing the alkali hydroxide; and
- a regeneration cell that receives the molecular iodine and the alkali hydroxide and is configured to cause a chemical reaction between the molecular iodine and the alkali hydroxide to regenerate the alkali metal iodide and wherein the regeneration cell comprises a metal-oxide catalyst to facilitate the reaction of molecular iodine and the alkali hydroxide to form the alkali metal iodide.

18. The electrochemical cell of claim 1, wherein the regeneration cell further comprises at least one of a alkali hydroxide, a heat source, a catalyst, an ultraviolet light source, and an ultrasonic vibration source, to facilitate the reaction of molecular iodine and the alkali hydroxide to form the alkali metal iodide.

* * * * *